(12) United States Patent
Szymanski et al.

(10) Patent No.: US 10,832,679 B2
(45) Date of Patent: Nov. 10, 2020

(54) METHOD AND SYSTEM FOR CORRECTING SPEECH-TO-TEXT AUTO-TRANSCRIPTION USING LOCAL CONTEXT OF TALK

(71) Applicant: International Business Machines Corporation, Armonk, NY (US)

(72) Inventors: Margaret H. Szymanski, Santa Clara, CA (US); Robert J. Moore, San Jose, CA (US); Sunhwan Lee, San Mateo, CA (US); Pawan Chowdhary, San Jose, CA (US); Shun Jiang, San Jose, CA (US); Guangjie Ren, Belmont, CA (US); Raphael Arar, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 16/196,245

(22) Filed: Nov. 20, 2018

(65) Prior Publication Data

US 2020/0160866 A1 May 21, 2020

(51) Int. Cl.
*G10L 15/26* (2006.01)
*G06N 5/02* (2006.01)
(Continued)

(52) U.S. Cl.
CPC .............. *G10L 15/26* (2013.01); *G06N 3/02* (2013.01); *G06N 5/02* (2013.01); *G06N 20/00* (2019.01); *G10L 15/16* (2013.01)

(58) Field of Classification Search
CPC ................................. G06F 40/47; G06F 40/44
(Continued)

(56) References Cited

U.S. PATENT DOCUMENTS 5,855,000 A 12/1998 Waibel et al.
6,205,426 B1 3/2001 Nguyen et al.
(Continued)

FOREIGN PATENT DOCUMENTS

CN 107704453 A 10/2017
JP 2001343994 A 12/2001

OTHER PUBLICATIONS

I. Jauk, A. Bonafonte and S. Pascual, "Acoustic feature prediction from semantic features for expressive speech using deep neural networks," 2016 24th European Signal Processing Conference (EUSIPCO), Budapest, 2016, pp. 2320-2324, doi: 10.1109/EUSIPCO.2016.7760663. (Year: 2016).*

(Continued)

*Primary Examiner* — Bharatkumar S Shah
(74) *Attorney, Agent, or Firm* — Sherman IP LLP; Kenneth L. Sherman; Hemavathy Perumal

(57) ABSTRACT

One embodiment provides a computer program product for improving accuracy of a transcript of a spoken interaction. The computer program product comprises a computer readable storage medium having program instructions embodied therewith. The program instructions are executable by a processor to cause the processor to identify a plurality of patterns in the transcript. The plurality of patterns are indicative of a group of acoustically similar words in the transcript and a corresponding local, sequential context of the group of acoustically similar words. The program instructions are further executable by the processor to cause the processor to predict conditional probabilities for the group of acoustically similar words based on a predictive model and the plurality of patterns, detect one or more transcription errors in the transcript based on the conditional probabilities, and correct the one or more transcription errors (Continued)

by applying a multi-pass correction on the one or more transcription errors.

20 Claims, 8 Drawing Sheets

(51) Int. Cl.
    *G10L 15/16*     (2006.01)
    *G06N 20/00*     (2019.01)
    *G06N 3/02*     (2006.01)

(58) Field of Classification Search
    USPC .......................................................... 704/235
    See application file for complete search history.

(56) References Cited

U.S. PATENT DOCUMENTS

| | | |
|---|---|---|
| 6,397,179 B2 | 5/2002 | Crespo et al. |
| 6,735,565 B2 | 5/2004 | Gschwendtner |
| 6,763,331 B2 | 7/2004 | Wakita et al. |
| 7,243,069 B2 | 7/2007 | Jaepel et al. |
| 7,805,299 B2 | 9/2010 | Coifman |
| 9,817,817 B2 | 11/2017 | Hosn et al. |
| 2004/0249637 A1 | 12/2004 | Baker et al. |
| 2015/0066502 A1* | 3/2015 | Achituv .................. G10L 15/14 704/235 |
| 2017/0018269 A1 | 1/2017 | Lev et al. |
| 2019/0251165 A1* | 8/2019 | Bachrach ................ G06F 40/30 |

OTHER PUBLICATIONS

Stolcke, A., "Humans versus Machines: The Case of Conversational Speech Recognition," Afeka Conference for Speech Processing, Jul. 3, 2017, pp. 1-56, Microsoft, United States.

* cited by examiner

500

1. raw hit count numbers
2. An estimate of cell counts [Southtown]
3. Used the genomic tools to count the coverage [contact]
4. Histogram of the rate counts [recall]
5. That had some counts in one or both of the samples [columns]
6. Sequence without any counts [calls]
7. Downward from the low counts to the high counts [local icon all]
8. Everything has no counts [call]
9. Distribution for the higher counts [calm]
10. Similar *distribution* of counts [cottons]
11. The *distribution* counts would be the same
12. The first high bar is the zero count [time varsity Roco]
13. But there are counts [about do you say the reset their laptop]
14. S1: Yep *that's had at least one* count in one of the samples [call]
15. S2: *that had at least one* count okay and then so ...
16. How many counts from each sample
17. And the counts that match it [constant much]
18. Is much bigger than the zero count [Europe]
19. Much much smaller than the zero count [your account]
20. You see a lot of zero count [your account]
21. I didn't know the total counts of the sequences [then sold it think was it]
22. The total counts in the left and right histogram
23. How many of those counts fall on these [called for]
24. I didn't count how many fall in the [called]
25. Come back to the zero count observation [countdown generation]
26. Checking the counts and so on [this confidential]
27. At the difference in counts between matches count - correct transcription (no correction needed)

[columns] - transcription error counts - correction for transcription error

*that had at least one* - local phrase

```
                                       or         that's
01  S2:  you know it's I think it's more ⇑  less a cell that    huge
         ~1.66
              so this is            [Bobby:] Hi Jamie
02  S0:  actually  ⇑   Jamie are            ⇑
         ~1.2
                                              an
03  S0:  and %HESITATION I if you think about it ⇑  unfertilized egg
         ~1.3
                                    cell
04  S0:  %HESITATION it's not a huge sal
         ~1.02
                            cell                       a cell
05  S0:  the the albumen is not a salve even the yoke is not itself %HESITATION
         but the yoke
06  S0:  need but your contains a single cell which has half the DNA
         ~0.97         to
07  S0:  you'd normally expect a have or something like that
         ~0.91                                             egg
08  S2:  right so it right when I I'm not saying the whole leg is a is a cell right
         ~0.56
09  S2:  but and Dylan didn't say that either but in any case you've got one cell
         ~1.35                                          an
10  S0:  yeah there there's like one cell or half a cell in ⇑ unfertilized egg 11  S2:  right
```

FIG. 5

METHOD AND SYSTEM FOR CORRECTING SPEECH-TO-TEXT AUTO-TRANSCRIPTION USING LOCAL CONTEXT OF TALK

The present invention generally relates to transcription systems, and more particularly, to a method and system for correcting speech-to-text auto-transcription using local context of talk.

BACKGROUND

A transcription system assists in the conversion of speech into a text transcript.

SUMMARY

One embodiment provides a computer program product for improving accuracy of a transcript of a spoken interaction. The computer program product comprises a computer readable storage medium having program instructions embodied therewith. The program instructions are executable by a processor to cause the processor to identify a plurality of patterns in the transcript. The plurality of patterns are indicative of a group of acoustically similar words in the transcript and a corresponding local, sequential context of the group of acoustically similar words. The program instructions are further executable by the processor to cause the processor to predict conditional probabilities for the group of acoustically similar words based on a predictive model and the plurality of patterns, detect one or more transcription errors in the transcript based on the conditional probabilities, and correct the one or more transcription errors by applying a multi-pass correction on the one or more transcription errors.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 illustrates excerpts of a transcript of a spoken interaction with corrections applied by the transcription auto-correction system, in accordance with an embodiment of the invention;

FIG. 5 illustrates different excerpts of a different transcript of a spoken interaction with corrections applied by the transcription auto-correction system, in accordance with an embodiment of the invention;

Figure 1:
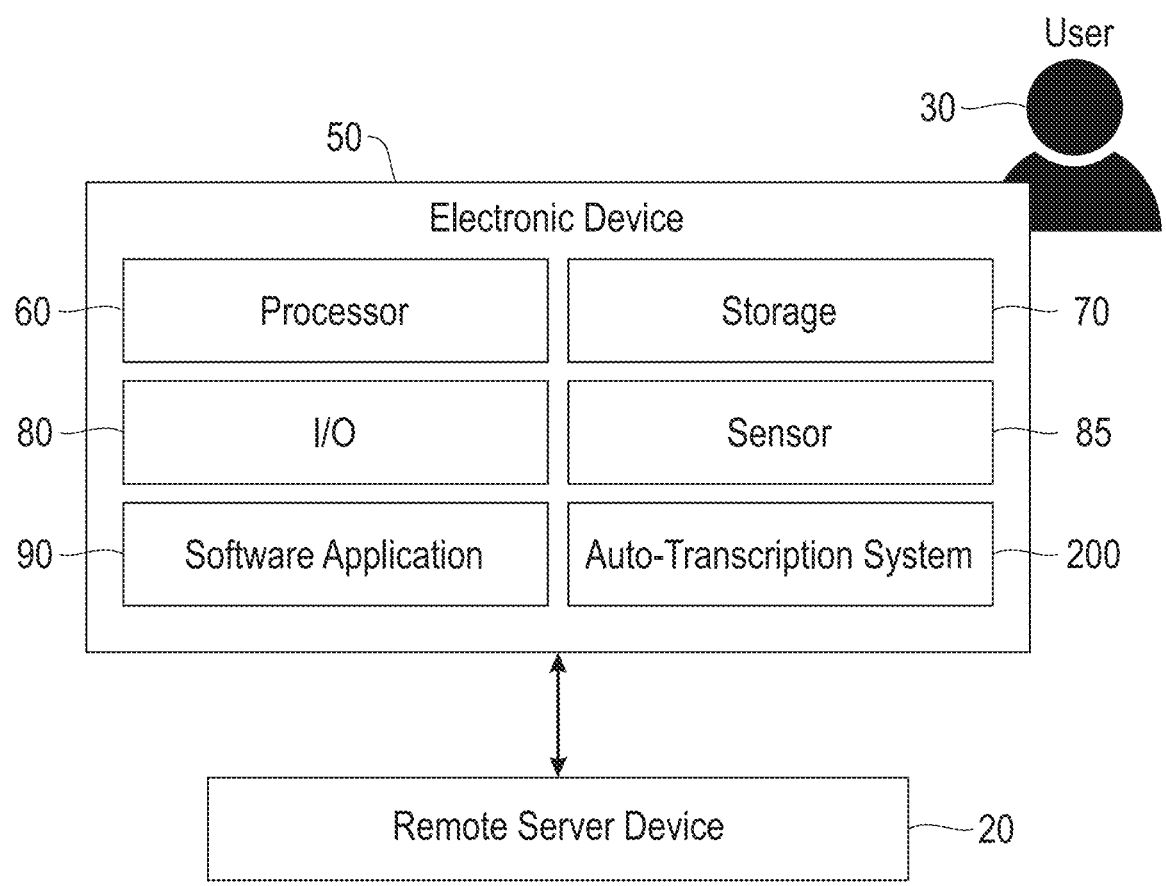
FIG. 1 illustrates a first example computing architecture for transcription auto-correction, in accordance with an embodiment of the invention.

The detailed description explains the preferred embodiments of the invention, together with advantages and features, by way of example with reference to the drawings.

DETAILED DESCRIPTION

The present invention generally relates to transcription systems, and more particularly, to a method and system for correcting speech-to-text auto-transcription using local context of talk. One embodiment provides a computer program product for improving accuracy of a transcript of a spoken interaction. The computer program product comprises a computer readable storage medium having program instructions embodied therewith. The program instructions are executable by a processor to cause the processor to identify a plurality of patterns in the transcript. The plurality of patterns are indicative of a group of acoustically similar words in the transcript and a corresponding local, sequential context of the group of acoustically similar words. The program instructions are further executable by the processor to cause the processor to predict conditional probabilities for the group of acoustically similar words based on a predictive model and the plurality of patterns, detect one or more transcription errors in the transcript based on the conditional probabilities, and correct the one or more transcription errors by applying a multi-pass correction on the one or more transcription errors.

For expository purposes, the term "spoken interaction" as used herein encompasses any kind of conversational action between two or more parties (i.e., participants) involving speech, such as a human-human spoken interaction (e.g., a conversation between humans), a human-machine spoken interaction (e.g., a conversation between a human and a communication system or a conversational system, such as a chatbot), etc.

For expository purposes, the term "problematic text" as used herein refers to a word or a sequence of words in a transcript that is predicted to be an error as a result of transcription ("transcription error"). The terms "problematic text" and "problematic word" are used interchangeably in this specification.

For expository purposes, the term "turns-at-talk" as used herein refers to parties involved in a spoken interaction speaking one at a time in alternating turns. The terms "turns-at-talk" and "speaker turns" are used interchangeably in this specification.

For expository purposes, the term "word repeats" as used herein refers to multiple mentions or repetitions of a word. The terms "word repeats", "word mentions", and "repetition occurrences" are used interchangeably in this specification.

Conventional speech-to-text auto-transcription systems could be more accurate. A common error is variability in transcribing the same word within the same passage. People engaged in talk-in-interaction naturally use redundancy to achieve joint understanding. For example, word repeats occur within and across turns-at-talk, and there are grammatical similarities across turns-at-talk. Existing solutions are based on systems that transcribe individual words based on its acoustic properties and anticipate next words based on models of grammar and global word grouping information.

One or more embodiments of the invention provide a method and system that utilizes local, sequential context of talk-in-interaction to improve accuracy of speech-to-text auto-transcription. One or more embodiments of the invention can be applied to transcribed data originating from human-human or human-machine language-based interaction (e.g., talk, text).

FIG. 1 illustrates a first example computing architecture for transcription auto-correction, in accordance with an embodiment of the invention. In one embodiment, transcription auto-correction is implemented on an electronic device 50 (i.e., on-device, real-time). For example, in one embodiment, the electronic device 50 comprises computation resources such as, but not limited to, one or more processor units 60 and one or more storage units 70. One or more applications execute/operate on the electronic device 50 utilizing the computation resources of the electronic device 50.

In one embodiment, the one or more applications on the electronic device 50 comprise an auto-transcription system 200 configured to: (1) receive, as input, speech data comprising a spoken interaction between two or more parties (i.e., participants), (2) apply transcription to the speech data to transcribe the speech data into text, producing transcribed data (i.e., a transcript) comprising the text, (3) correct the transcribed data based on local, sequential context of the spoken interaction to improve the accuracy of the transcription, and (4) generate, as output, the corrected transcribed data.

In one embodiment, the auto-transcription system 200 is configured to exchange data with a remote server device 20 over a connection (e.g., a wireless connection such as a Wi-Fi connection or a cellular data connection, a wired connection, or a combination of the two). In one embodiment, a remote server device 20 is a data source.

In one embodiment, the one or more applications on the electronic device 50 further include one or more optional software applications 90 loaded onto or downloaded to the electronic device 50 (e.g., a web application, a mobile application, etc.).

In one embodiment, the auto-transcription system 200 is accessed or utilized by one or more online services (e.g., AI services, other transcription systems, analytics systems, conversational systems such as human-machine communication systems, etc.) hosted on a remote server device 20 and/or one or more software applications 90 operating on the electronic device 50. For example, in one embodiment, a software application 90 (e.g., a translation application, etc.) on the electronic device 50 utilizes the auto-transcription system 200 to transcribe a spoken interaction between two or more parties as the interaction unfolds.

In one embodiment, the electronic device 50 comprises any type of electronic device such as, but not limited to, a desktop computer, a smart television, a smart car, a mobile device (e.g., a smart phone, a tablet, a laptop, etc.), a wearable device (e.g., a smart watch), an Internet of Things (IoT) device, etc.

In one embodiment, the electronic device 50 comprises one or more input/output (I/O) units 80 integrated in or coupled to the electronic device 50, such as a keyboard, a keypad, a touch interface, a display screen, etc. In one embodiment, a user 30 utilizes an I/O unit 80 of the electronic device 50 to configure one or more user preferences, configure one or more parameters (e.g., one or more pre-defined thresholds), enter text input, etc.

In one embodiment, the electronic device 50 comprises one or more optional sensor units 85 integrated in or coupled to the electronic device 50, such as a GPS, an image sensor (e.g., a camera), a microphone, etc. In one embodiment, the auto-transcription system 200 utilizes at least one sensor unit 85 of the electronic device 50 to capture a spoken interaction, such as a microphone for an audio recording of the spoken interaction. In one embodiment, the auto-transcription system 200 utilizes at least one sensor unit 85 of the electronic device 50 to capture context information related to the spoken interaction, such as a GPS for location data (e.g., location coordinates), an image sensor for image/video data (e.g., a live video capture or a photograph of one or more parties involved in the spoken interaction and/or an environment of the electronic device 50).

Figure 2:
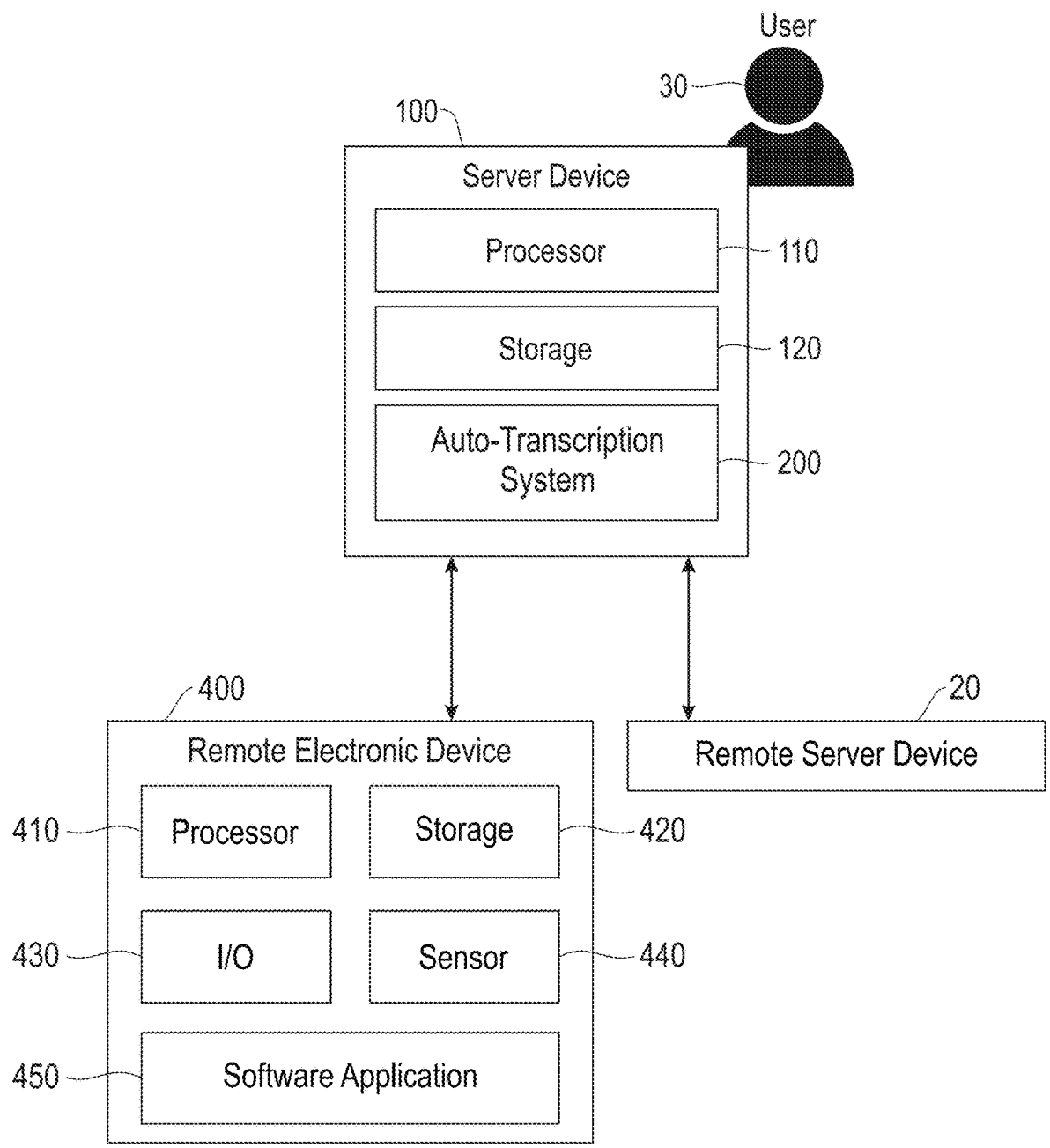
FIG. 2 illustrates a second example computing architecture for transcription auto-correction, in accordance with an embodiment of the invention.

FIG. 2 illustrates a second example computing architecture for transcription auto-correction, in accordance with an embodiment of the invention. In another embodiment, transcription auto-correction is implemented on a server device 100 (i.e., off-device, offline). For example, in one embodiment, the server device 100 comprises computation resources such as, but not limited to, one or more processor units 110 and one or more storage units 120. One or more applications execute/operate on the server device 100 utilizing the computation resources of the server device 100.

In one embodiment, the one or more applications on the server device 100 comprise an auto-transcription system 200 configured to: (1) receive, as input, speech data comprising a spoken interaction between two or more parties, (2) apply transcription to the speech data to transcribe the speech data into text, producing transcribed data (i.e., a transcript) comprising the text, (3) correct the transcribed data based on local, sequential context of the spoken interaction to improve the accuracy of the transcription, and (4) generate, as output, the corrected transcribed data.

In one embodiment, the auto-transcription system 200 is configured to exchange data with a remote electronic device 400 and/or a remote server device 20 over a connection (e.g., a wireless connection such as a Wi-Fi connection or a cellular data connection, a wired connection, or a combination of the two). In one embodiment, a remote electronic device 400 and/or a remote server device 20 is a data source.

In one embodiment, a remote electronic device 400 is equipped with one or more computation resources such as, but not limited to, one or more processor units 410 and one or more storage units 420. One or more applications execute/operate on a remote electronic device 400 utilizing one or more computation resources of the remote electronic device 400 such as, but not limited to, one or more software applications 450 loaded onto or downloaded to the remote electronic device 400 (e.g., a web application, a mobile application, etc.).

In one embodiment, the auto-transcription system 200 may be accessed or utilized by one or more online services (e.g., AI services, other transcription systems, analytics systems, conversational systems such as human-machine communication systems, etc.) hosted on a remote server device 20 and/or one or more software applications 450 operating on a remote electronic device 400. For example, in one embodiment, a software application 450 (e.g., a translation application, etc.) on the remote electronic device 400 utilizes the auto-transcription system 200 to transcribe a spoken interaction between two or more parties as the interaction unfolds.

In one embodiment, a remote electronic device 400 comprises any type of electronic device such as, but not limited to, a desktop computer, a smart television, a smart car, a mobile device (e.g., a smart phone, a tablet, a laptop, etc.), a wearable device (e.g., a smart watch), an Internet of Things (IoT) device, etc.

In one embodiment, a remote electronic device 400 comprises one or more I/O units 430 integrated in or coupled to the remote electronic device 400, such as a keyboard, a keypad, a touch interface, a display screen, etc. In one embodiment, a user 30 utilizes an I/O unit 430 of a remote electronic device 400 to configure one or more user preferences, configure one or more parameters (e.g., one or more pre-defined thresholds), enter text input, etc.

In one embodiment, the remote electronic device 400 comprises one or more optional sensor units 440 integrated in or coupled to the remote electronic device 400, such as a GPS, an image sensor (e.g., a camera), a microphone, etc. In one embodiment, the auto-transcription system 200 utilizes at least one sensor unit 440 of the remote electronic device 400 to capture a spoken interaction, such as a microphone for an audio recording of the spoken interaction. In one embodiment, the auto-transcription system 200 utilizes at least one sensor unit 440 of the remote electronic device 400 to capture context information related to the spoken interaction, such as a GPS for location data (e.g., location coordinates), an image sensor for image/video data (e.g., a live video capture or a photograph of one or more parties involved in the spoken interaction and/or an environment of the remote electronic device 400).

In one embodiment, the service device 200 is part of a cloud computing environment.

Figure 3A:
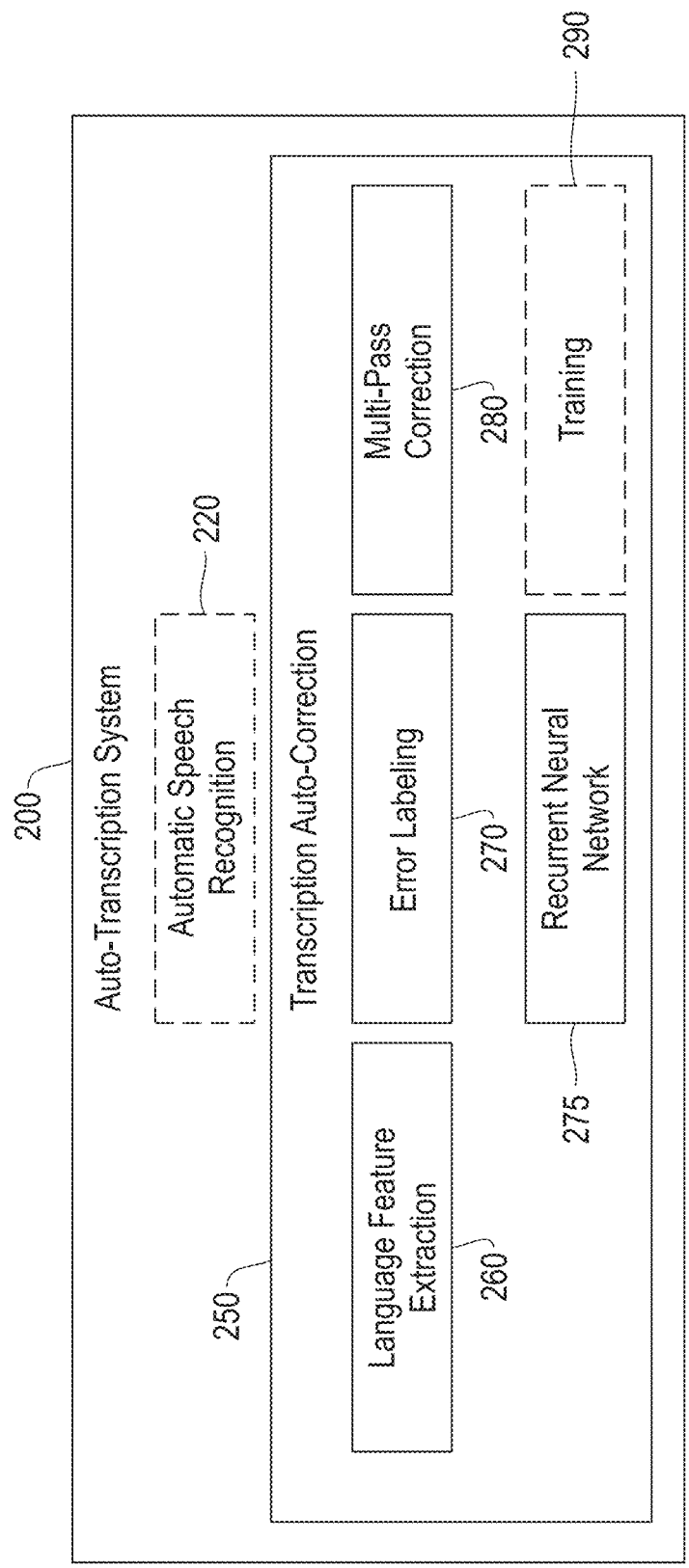
FIG. 3A illustrates an example auto-transcription system, in accordance with an embodiment of the invention.
Figure 3B:
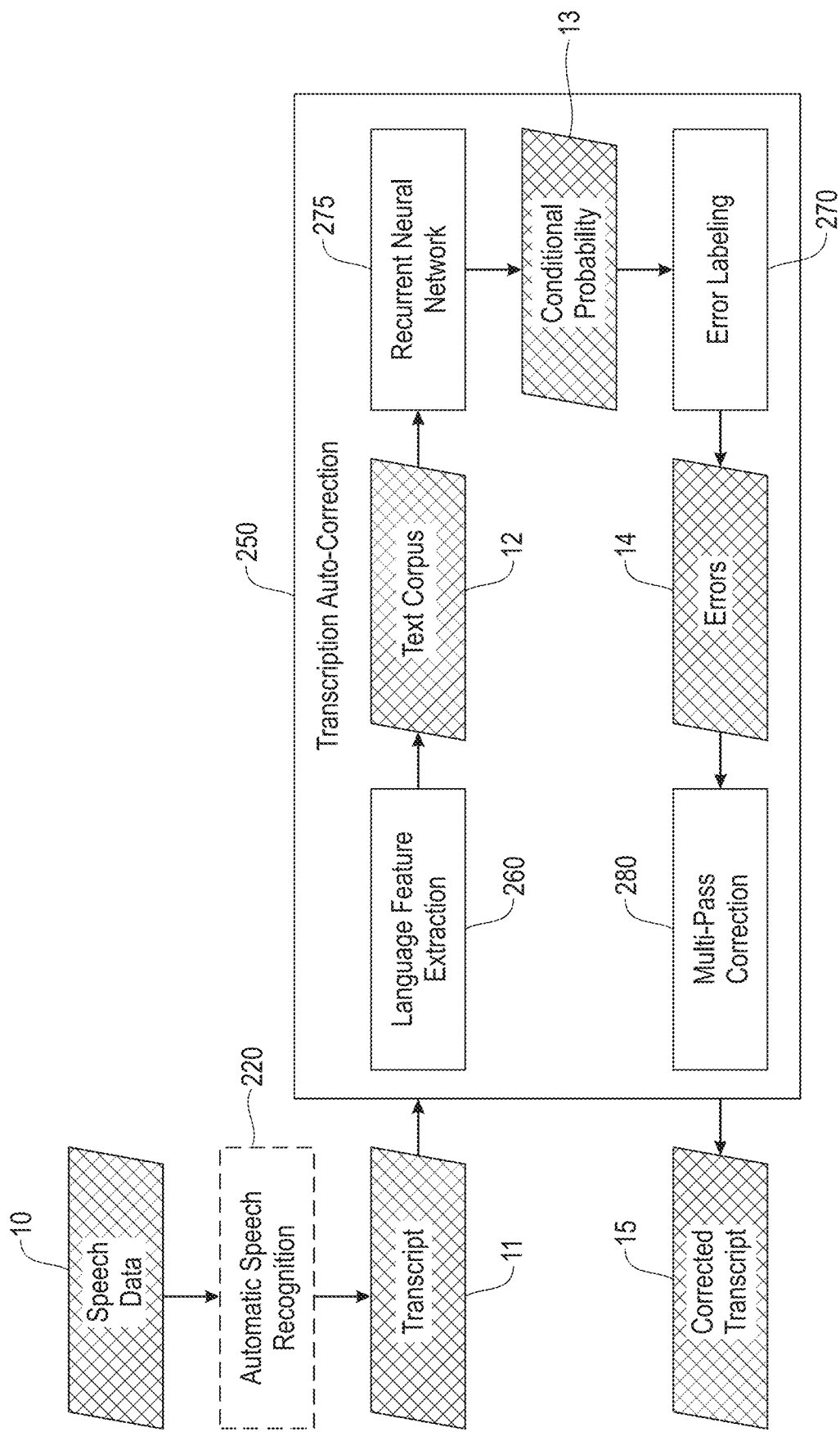
FIG. 3B illustrates an example workflow of the auto-transcription system in FIG. 3A, in accordance with an embodiment of the invention.

FIG. 3A illustrates an example auto-transcription system 200, in accordance with an embodiment of the invention. FIG. 3B illustrates an example workflow of the auto-transcription system 200 in FIG. 3A, in accordance with an embodiment of the invention. In one embodiment, the auto-transcription system 200 comprises a transcription auto-correction system 250 configured to: (1) receive, as input, a transcript 11 (i.e., transcribed data) of a spoken interaction between two or more parties, (2) perform auto-correction on the transcript 11 based on local, sequential context of the spoken interaction, and (3) generate, as output, a corrected transcript 15 based on the auto-correction.

In one embodiment, the transcription auto-correction system 250 is configured to receive a transcript 11 from an application, an AI service, another transcription system, an analytics system, or a conversational system located on-device (i.e., the electronic device 50 in FIG. 1) or off-device (i.e., the remote electronic device 400 or the remote server device 20 in FIG. 2). In another embodiment, the auto-transcription system 200 comprises an optional automatic speech recognition (ASR) unit 220 configured to: (1) receive, as input, speech data 10 comprising a spoken interaction between two or more parties (e.g., the speech data 10 is an audio recording of the spoken interaction captured by a sensor unit), (2) apply a speech-to-text algorithm to the speech data 10 to transcribe the speech data into text and produce a transcript 11 including the text, and (3) provide the transcript 11 to the transcription auto-correction system 250.

In one embodiment, the transcription auto-correction system 250 is further configured to receive, as input, one or more of the following: context information related to a spoken interaction, text input, one or more user preferences, one or more parameters (e.g., one or more pre-defined thresholds), etc.

In one embodiment, the transcription auto-correction system 250 comprises a language feature extraction unit 260 configured to: (1) identify one or more patterns associated with problematic text ("problematic patterns") in a transcript 11 of a spoken interaction, and (2) generate a text corpus 12 of the spoken interaction, wherein the text corpus 12 is indicative of the one or more problematic patterns identified.

For example, in one embodiment, the language feature extraction unit 260 is configured to identify one or more problematic patterns in a transcript 11 of a spoken interaction by: (1) identifying a group of words that sound acoustically similar ("group of acoustically similar words") within and across turns-at-talk of the spoken interaction, (2) identifying a corresponding local, sequential context of the group of acoustically similar words, wherein the local, sequential context represents one or more common features identified in environments in which word repeats of the group of acoustically similar words occurs such as, but not limited to, one or more common local phrases around prior and/or subsequent word repeats, grammatical similarities around word repeats across speaker turns, etc., (3) for each word of the group of acoustically similar words, across speaker turns, increasing a weight of subsequent word mentions of the word occurring within subsequent speaker turns over prior word mentions of the word if the subsequent word mentions occur in environments substantially similar to a corresponding local, sequential context for the word (e.g., a similar local phrase around the word), and (4) for each word of the group of acoustically similar words, across speaker turns, increasing a weight of longer local phrases around word mentions of the word that match to increase/improve a likelihood/probability of the word as a candidate for correction (i.e., recommending/suggesting the word as a correction for a problematic word).

In one embodiment, the transcription auto-correction system 250 comprises an optional training unit 290 configured to, in a training phase, apply machine learning to train a predictive model to identify and correct transcription errors in a transcript 11 based on training data. For example, in one embodiment, text corpora 12 of spoken interactions are provided as training data for machine learning to train a predictive model to learn problematic patterns and corrections for problematic text. In one embodiment, training data can include user-specific speech patterns (i.e., individual speech patterns). In one embodiment, training a predictive model is performed offline (e.g., on a remote server device 20).

In one embodiment, a predictive model trained by the training unit 290 is a recurrent neural network (RNN) 275. After training, the resulting RNN 275 is deployed for use in a deployment phase to capture long term dependency of word repeats of a word in a transcript 11. For example, in one embodiment, in response to receiving a text corpus 12 of a spoken interaction from the language feature extraction unit 260, the RNN 275 is configured to predict, for each word of a group of acoustically similar words (e.g., identified by the language feature extraction unit 260) in a transcript 11 of the spoken interaction, a corresponding conditional probability 13 of the word.

In one embodiment, the transcription auto-correction system 250 is configured to analyze each word in a group of words similar to how human listeners analyze a speaker's words, i.e., as the words are sequentially produced by the speaker in a time-based speech process. Let Prob (next- _word|current_word) generally denote a conditional probability of a target word within a group of acoustically similar words, wherein current_word denotes the target word, the conditional probability is calculated by analyzing a word context representing one or more sequences of words around current_word, the word context comprises minimally of last_word and next_word, last_word denotes a word immediately preceding current_word in a time-based speech process, and next_word denotes a word immediately following current_word in the time-based speech process. In one embodiment, the RNN 275 is trained to generate/output a conditional probability Prob (next_word|current_word) of a target word current_word in a transcript.

In one embodiment, the transcription auto-correction system 250 comprises an error labeling unit 270 configured to: (1) detect one or more transcription errors 14 in a transcript 11 based on conditional probabilities 13 predicted by the RNN 275 for a group of acoustically similar words in the transcript 11, wherein each transcription error 14 is a potential problematic word, and (2) label (e.g., flag) each transcription error 14 in the transcript 11. In one embodiment, a word of the group of acoustically similar words is labeled as a transcription error 14 if a corresponding conditional probability predicted for the word is less than a pre-defined threshold for accuracy.

In one embodiment, the transcription auto-correction system 250 comprises a multi-pass correction unit 280 configured to apply a multi-pass correction to a transcript 11 of a spoken interaction to improve accuracy of transcription of the spoken interaction. Specifically, the multi-pass correction unit 280 is configured to: (1) for each word of a group of acoustically similar words (e.g., identified by the language feature extraction unit 260) in the transcript 11, determine (i.e., compute) a corresponding contextual score for the word, wherein the contextual score is a sum of a corresponding conditional probability for the word (e.g., predicted by the RNN 275) and a total number of repetition occurrences of the word in the transcript 11, (2) select a word from the group of acoustically similar words with a corresponding contextual score that is the highest across the group of acoustically similar words as a candidate for correction, and (3) correct a transcription error 14 in the transcript 11 (e.g., detected and labeled by the error labeling unit 270) with the word selected (e.g., replacing the transcription error 14 with the word selected). After the multi-pass correction, a resulting corrected transcript 15 is provided as output.

In one embodiment, a multi-pass correction performed by the multi-pass correction unit 280 repeats until no more transcription errors 14 are detected in the transcript 11.

In one embodiment, the auto-transcription system 200 is configured to determine a confidence level for a transcription of a spoken interaction. In one embodiment, a multi-pass correction performed by the multi-pass correction unit 280 repeats until a confidence level for a transcription achieves a desired level of accuracy (e.g., meets or exceeds a pre-defined threshold for accuracy).

For example, in one embodiment, in response to receiving a transcript 11 of a spoken interaction, the RNN 275 is configured to compute, for each word in the transcript 11, a corresponding conditional probability 13 of the word. If a corresponding conditional probability 13 of a word in the transcript 11 is low (e.g., less than a pre-defined threshold for accuracy), the error labeling unit 270 labels/flags the word as a transcription error 14. For a group of acoustically similar words, the transcription auto-correction system 250 determines the most likely word in the group as a candidate for correction based on conditional probabilities of each word of the group and number of repetition occurrences of each word of the group in the transcript 11, and recommends the candidate for correction as a replacement for one or more other words of the group that are labeled/flagged as a transcription error 14 in the transcript 11.

In one embodiment, the auto-transcription system 200 is implemented using a centralized computing environment. In another embodiment, the auto-transcription system 200 is implemented using a distributed computing environment (i.e., one or more components of the auto-transcription system 200 are remote relative to one or more other components of the auto-transcription system 200).

In one embodiment, the auto-transcription system 200 is embedded in, integrated with, or connected to other systems to improve the effectiveness of the other systems such as, but not limited to, other transcription systems, analytics systems that depend on transcription services, conversational systems such as human-machine communication systems, and other speech-to-text technologies (e.g., Watson speech applications and services, etc.).

FIG. 4 illustrates excerpts 500 of a transcript of a spoken interaction with corrections applied by the transcription auto-correction system 250, in accordance with an embodiment of the invention. Assume that for a target word "count" (and its plural form "counts"), the excerpts 500 includes correct transcriptions of the target word and transcription errors of the target word. For illustration purposes, as shown in FIG. 4, each correct transcription of the target word is represented in highlight (see lines 1, 11, 15-16, 22 and 27 of the excerpts 500), and each transcription error of the target word is represented in a pair of brackets (see lines 2-10, 12-14, 17-21, and 23-26 of the excerpts 500).

In response to receiving the transcript, the transcription auto-correction system 250 identifies a group of acoustically similar words within and across turns-at-talk of the spoken interaction in the transcript such as, but not limited to, the target word "count", a word "contact" (see line 3 of the excerpts 500), a word "call" (see line 8 of the excerpts 500), a word "calm" (see line 9 of the excerpts 500), etc. The transcription auto-correction system 250 further identifies a corresponding local, sequential context of the group of acoustically similar words, wherein the local, sequential context represents one or more common features identified in environments in which word repeats of the group of acoustically similar words occurs such as, but not limited to, a local phrase "distribution" around some of the word repeats, a local phrase "that had at least one" (and its variation "that's had at least one") around some of the other word repeats, etc. For illustration purposes, as shown in FIG. 4, each local phrase is represented in italics (see lines 10-11 and 14-15 of the excerpts 500).

As shown in FIG. 4, the transcription auto-correction system 250 detects and labels transcription errors (based on conditional probabilities predicted for the group of acoustically similar words), and applies multi-pass correction to the transcript to correct the transcription errors. Specifically, the transcription auto-correction system 250 determines, for each word of the group of acoustically similar words, a corresponding contextual score for the word (i.e., the corresponding contextual score is a sum of a corresponding conditional probability for the word and a total number of repetition occurrences of the word in the transcript). The transcription auto-correction system 250 selects a word from the group of acoustically similar words with the highest contextual score across the group of acoustically similar words as a candidate for correction, and replaces each transcription error in the transcript with the candidate selected for correction. For illustration purposes, as shown in FIG. 4, each correction is represented in underline (see lines 2-10, 12-14, 17-21, and 23-26 of the excerpts 500).

For example, as shown in FIG. 4, line 14 of the excerpts 500 indicates that there is a transcription error of the target word "count" within a speaker turn of a speaker S1, wherein an acoustically similar word "call" is transcribed instead of the target word. Prior to this speaker turn, there are 14 prior word repeats of the group of acoustically similar words. After this speaker turn, there are 11 subsequent word repeats of the group of acoustically similar words. As shown in FIG. 4, lines 14-15 of the excerpts 500 further indicate that the local phrase "that had at least one" (and its variation "that's had at least one") occurs around some of the word repeats, specifically within and across speaker turns of the speaker S1 and another speaker S2. The transcription auto-correction system 250 corrects the transcription error at line 14 of the excerpts 500 by replacing the transcription error with a candidate for correction, i.e., a candidate that includes the target word "count".

As another example, as shown in FIG. 4, line 10 of the excerpts 500 indicates that there is a transcription error of the word "counts" (i.e., the plural form of the target word "count"), wherein an acoustically similar word "cottons" is transcribed instead of the word "counts". As shown in FIG. 4, lines 10-11 of the excerpts 500 further indicate that the local phrase "distribution" occurs around some of the word repeats. The transcription auto-correction system 250 corrects the transcription error at line 10 of the excerpts 500 by replacing the transcription error with a candidate for correction, i.e., a candidate that includes the word "counts".

FIG. 5 illustrates different excerpts 700 of a different transcript of a spoken interaction with corrections applied by the transcription auto-correction system 250, in accordance with an embodiment of the invention. Assume that for a target word "cell", the excerpts 700 includes correct transcriptions of the target word "cell" (see lines 01, 06 and 08-10 of the excerpts 700) and transcription errors of the target word "cell" (see acoustically similar words "sal", "salve", and "itself" at lines 04-05 of the excerpts 700). The transcription auto-correction system 250 corrects each transcription error of the target word "cell" by replacing the transcription error with a candidate for correction, i.e., a candidate that includes the target word "cell".

Further, assume that for a target word "egg", the excerpts 700 includes correct transcriptions of the target word "egg" (see lines 03 and 10 of the excerpts 700) and transcription errors of the target word "egg" (see acoustically similar word "leg" at line 08 of the excerpts 700). The transcription auto-correction system 250 corrects each transcription error of the target word "egg" by replacing the transcription error with a candidate for correction, i.e., a candidate that includes the target word "egg".

Figure 6:
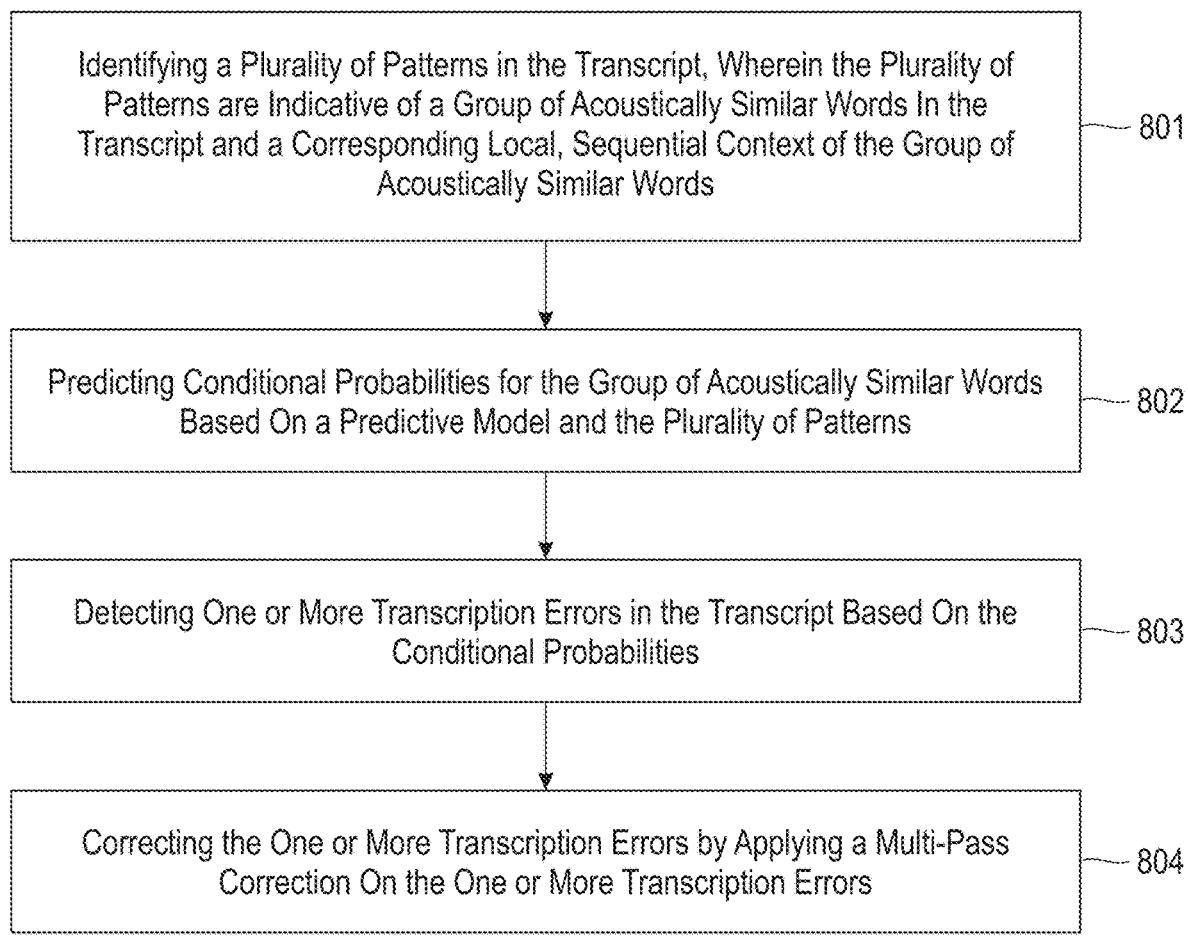
FIG. 6 is a flowchart for an example process for implementing transcription auto-correction, in accordance with an embodiment of the invention.

FIG. 6 is a flowchart for an example process 800 for implementing transcription auto-correction, in accordance with an embodiment of the invention. Process block 801 includes identifying a plurality of patterns in the transcript, wherein the plurality of patterns are indicative of a group of acoustically similar words in the transcript and a corresponding local, sequential context of the group of acoustically similar words. Process block 802 includes predicting conditional probabilities for the group of acoustically similar words based on a predictive model and the plurality of patterns. Process block 803 includes detecting one or more transcription errors in the transcript based on the conditional probabilities. Process block 804 includes correcting the one or more transcription errors by applying a multi-pass correction on the one or more transcription errors.

In one embodiment, process blocks 801-804 are performed by one or more components of the auto-transcription system 200, such as the transcription auto-correction system 250.

Figure 7:
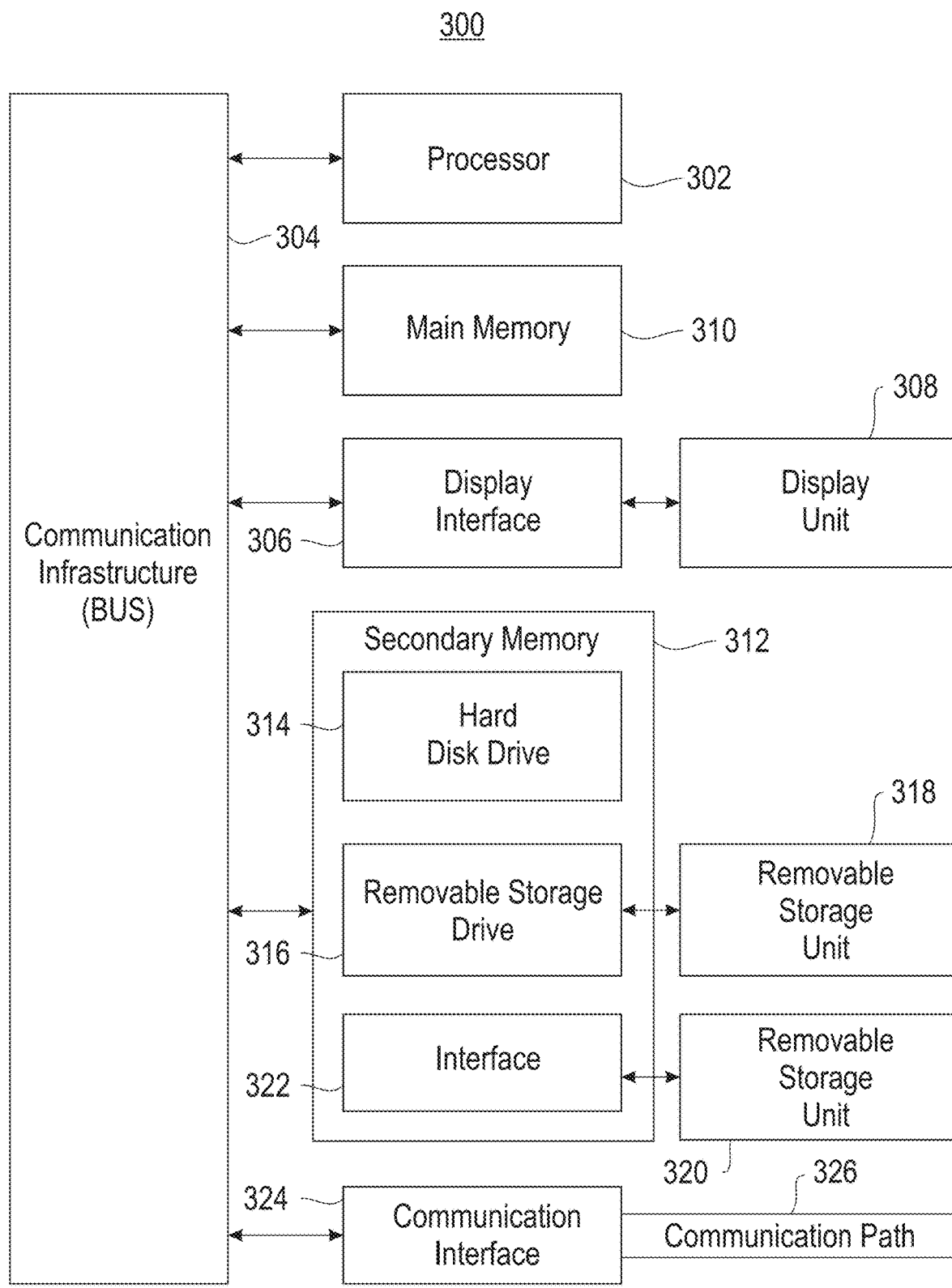
FIG. 7 is a high level block diagram showing an information processing system useful for implementing an embodiment of the present invention.

FIG. 7 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the voice communication infrastructure 304 (or from a frame buffer not shown) for display on a display unit 308. In one embodiment, the computer system also includes a main memory 310, preferably random access memory (RAM), and also includes a secondary memory 312. In one embodiment, the secondary memory 312 includes, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 includes other similar means for allowing computer programs or other instructions to be loaded into the computer system. Such means include, for example, a removable storage unit 320 and an interface 322. Examples of such means include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

In one embodiment, the computer system also includes a communication interface 324. Communication interface 324 allows software and data to be transferred between the computer system and external devices. In one embodiment, examples of communication interface 324 include a modem, a network interface (such as an Ethernet card), a communication port, or a PCMCIA slot and card, etc. In one embodiment, software and data transferred via communication interface 324 are in the form of signals which are, for example, electronic, electromagnetic, optical, or other signals capable of being received by communication interface 324. These signals are provided to communication interface 324 via a communication path (i.e., channel) 326. In one embodiment, this communication path 326 carries signals and is implemented using wire or cable, fiber optics, a phone line, a cellular phone link, an RF link, and/or other communication channels.

Embodiments of the present invention provide a system, a method, and/or a computer program product. In one embodiment, the computer program product includes a computer readable storage medium (or media) having computer readable program instructions thereon for causing a processor to carry out aspects of the present invention. The computer readable storage medium can be a tangible device that can retain and store instructions for use by an instruction execution device. In one embodiment, the computer readable storage medium is, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. In one embodiment, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one embodiment, computer readable program instructions for carrying out operations of embodiments of the present invention are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In one embodiment, the computer readable program instructions execute entirely on the user's computer, partly on the user's computer, as a stand-alone software package, partly on the user's computer and partly on a remote computer or entirely on the remote computer or server. In the latter scenario, in one embodiment, the remote computer is connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one embodiment, these computer readable program instructions are provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one embodiment, these computer readable program instructions are also stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one embodiment, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, in one embodiment, each block in the flowchart or block diagrams represents a module, segment, or portion of instructions, which comprises one or more executable instructions for implementing the specified logical function(s). In some alternative implementations, the functions noted in the block occur out of the order noted in the figures. For example, in one embodiment, two blocks shown in succession are, in fact, executed substantially concurrently, or the blocks are sometimes executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that embodiments of the present invention provide a system, computer program product, and method for implementing the embodiments of the invention. Embodiments of the present invention further provide a non-transitory computer-useable storage medium for implementing the embodiments of the invention. The non-transitory computer-useable storage medium has a computer-readable program, wherein the program upon being processed on a computer causes the computer to implement the steps of embodiments of the present invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. Various embodiments of the invention were chosen and described in order to best explain the principles of the embodiments of the invention and the practical application, and to enable others of ordinary skill in the art to understand the embodiments of the invention with various modifications as are suited to the particular use contemplated.

What is claimed is:

1. A computer program product for improving accuracy of a transcript of a spoken interaction, the computer program product comprising a non-transitory computer readable storage medium having program instructions embodied therewith, the program instructions executable by a processor to cause the processor to:
   identify a group of acoustically similar words in the transcript;
   identify a corresponding local, sequential context of the group of acoustically similar words, wherein the corresponding local, sequential context is indicative of one or more common features across portions of the transcript in which the group of acoustically similar words occur;
   predict conditional probabilities for the group of acoustically similar words based on a predictive model and the corresponding local, sequential context;
   detect one or more transcription errors in the transcript based on the conditional probabilities; and
   correct the one or more transcription errors by applying a multi-pass correction on the one or more transcription errors.

2. The computer program product of claim 1, wherein the predictive model comprises a recurrent neural network.

3. The computer program product of claim 1, wherein the program instructions are further executable by the processor to cause the processor to:
   identify the group of acoustically similar words within and across turns-at-talk of the spoken interaction;
   wherein the corresponding local, sequential context represents the one or more common features identified in environments in which word repeats of the group of acoustically similar words occurs.

4. The computer program product of claim 3, wherein the program instructions are further executable by the processor to cause the processor to:
   for each word of the group of acoustically similar words, across speaker turns, increase a weight of one or more subsequent word mentions of the word occurring within one or more subsequent speaker turns over one or more prior word mentions of the word if the one or more subsequent word mentions occur in one or more environments substantially similar to the corresponding local, sequential context.

5. The computer program product of claim 3, wherein the program instructions are further executable by the processor to cause the processor to:
   for each word of the group of acoustically similar words, across speaker turns, increase a weight of one or more longer local phrases around one or more word mentions of the word that match.

6. The computer program product of claim 1, wherein the program instructions are further executable by the processor to cause the processor to:
   for each word of the group of acoustically similar words:
      determine whether a corresponding conditional probability for the word is less than a pre-determined threshold; and
      label the word as a transcription error in response to determining the corresponding conditional probability is less than the pre-determined threshold.

7. The computer program product of claim 1, wherein the program instructions are further executable by the processor to cause the processor to:
   for each word of the group of acoustically similar words, determine a corresponding contextual score for the word, wherein the contextual score is a sum of a corresponding conditional probability for the word and a number of repetition occurrences of the word in the transcript;
   select a word from the group of acoustically similar words with a corresponding contextual score that is the highest across the group of acoustically similar words; and
   correct each transcription error based on the word selected.

8. The computer program product of claim 7, wherein the multi-pass correction is repeated until a confidence level of a transcript resulting from the multi-pass correction meets or exceeds a pre-defined threshold for accuracy.

9. The computer program product of claim 1, wherein the predictive model is trained offline on a server device.

10. A system for improving accuracy of a transcript of a spoken interaction, comprising:
    at least one processor; and
    a non-transitory processor-readable memory device storing instructions that when executed by the at least one processor causes the at least one processor to perform operations including:
       identifying a group of acoustically similar words in the transcript;

identifying a corresponding local, sequential context of the group of acoustically similar words, wherein the corresponding local, sequential context is indicative of one or more common features across portions of the transcript in which the group of acoustically similar words occur;

predicting conditional probabilities for the group of acoustically similar words based on a predictive model and the corresponding local, sequential context;

detecting one or more transcription errors in the transcript based on the conditional probabilities; and correcting the one or more transcription errors by applying a multi-pass correction on the one or more transcription errors.

11. The system of claim 10, wherein the predictive model comprises a recurrent neural network.

12. The system of claim 10, wherein identifying a plurality of patterns in a transcript comprises:

identifying the group of acoustically similar words within and across turns-at-talk of the spoken interaction;

wherein the corresponding local, sequential context represents the one or more common features identified in environments in which word repeats of the group of acoustically similar words occurs.

13. The system of claim 12, wherein identifying a plurality of patterns in a transcript further comprises:

for each word of the group of acoustically similar words, across speaker turns, increase a weight of one or more subsequent word mentions of the word occurring within one or more subsequent speaker turns over one or more prior word mentions of the word if the one or more subsequent word mentions occur in one or more environments substantially similar to the corresponding local, sequential context.

14. The system of claim 12, wherein identifying a plurality of patterns in a transcript further comprises:

for each word of the group of acoustically similar words, across speaker turns, increase a weight of one or more longer local phrases around one or more word mentions of the word that match.

15. The system of claim 10, wherein detecting one or more transcription errors in the transcript based on the conditional probabilities comprises:

for each word of the group of acoustically similar words:
determining whether a corresponding conditional probability for the word is less than a pre-determined threshold; and labeling the word as a transcription error in response to determining the corresponding conditional probability is less than the pre-determined threshold.

16. The system of claim 10, wherein correcting the one or more transcription errors by applying a multi-pass correction on the one or more transcription errors comprises:

for each word of the group of acoustically similar words, determining a corresponding contextual score for the word, wherein the contextual score is a sum of a corresponding conditional probability for the word and a number of repetition occurrences of the word in the transcript;

selecting a word from the group of acoustically similar words with a corresponding contextual score that is the highest across the group of acoustically similar words; and correcting each transcription error based on the word selected.

17. The system of claim 16, wherein the multi-pass correction is repeated until a confidence level of a transcript resulting from the multi-pass correction meets or exceeds a pre-defined threshold for accuracy.

18. The system of claim 10, wherein the predictive model is trained offline on a server device.

19. A computer program product for improving accuracy of a transcript of a spoken interaction, the computer program product comprising a non-transitory computer readable storage medium having program code embodied therewith, the program code being executable by a computer to implement a method comprising:

identifying a group of acoustically similar words in the transcript;

identifying a corresponding local, sequential context of the group of acoustically similar words, wherein the corresponding local, sequential context is indicative of one or more common features across portions of the transcript in which the group of acoustically similar words occur;

predicting conditional probabilities for the group of acoustically similar words based on a predictive model and the corresponding local, sequential context;

detecting one or more transcription errors in the transcript based on the conditional probabilities; and correcting the one or more transcription errors by applying a multi-pass correction on the one or more transcription errors.

20. The computer program product of claim 19, wherein the predictive model comprises a recurrent neural network.

* * * * *